United States Patent Office 3,567,759
Patented Mar. 2, 1971

3,567,759
DIMERIZATION OF ACRYLONITRILE
Victor Tullio, Wilmington, Del., assignor to E. I. du Pont de Nemours and Company, Wilmington, Del.
No Drawing. Continuation-in-part of application Ser. No. 256,227, Feb. 5, 1963. This application Apr. 30, 1963, Ser. No. 277,030
Int. Cl. C07c *121/02, 121/20*
U.S. Cl. 260—465.8                                8 Claims

ABSTRACT OF THE DISCLOSURE

Alpha-methyleneglutaronitrile is prepared by dimerizing acrylonitrile in the presence of tertiary phosphine catalysts.

---

This invention is directed to a novel process for the preparation of the dimer of acrylonitrile. More particularly, this invention is directed to a process for preparing the dimer of acrylonitrile by treating said monomer in the presence of tertiary phosphines.

One of the conventional methods for the dimerization of acrylic compounds involves treating the monomer with an alkali metal or its enolate, phenolate or amide. However, these conventional methods give low yields and are not desirable. For instance, reaction of ethyl acrylate at 80° C. in the presence of sodium methoxide gave only a 10% yield of the dimer, diethyl α-methyleneglutarate (J. Chem. Soc. 1925, 2779).

Dimers of acrylic compounds have also been obtained by heating the monomer in the liquid phase to at least 160° C. in the presence of a polymerization inhibitor. However, when acrylonitrile is heated to 200° C. by this method, formation of polyacrylonitrile resin is reported as well as a dimer of unspecified structure (see U.S. 2,232,785). Heating of acrylonitrile to higher temperatures, i.e., to 300° C., favors the formation of 1,2-dicyanocyclobutanes (J. Am. Chem. Soc. 71, 324 (1949)).

It is, therefore, an object of this invention to provide a novel process for the preparation of α-methyleneglutaronitrile by dimerization of acrylonitrile in good yields with a minimum formation of higher molecular weight products.

This and other objects will become apparent from the following description and claims.

More specifically, the present invention is directed to a process for the preparation of the nitrile of α-methyleneglutaric acid, which process comprises dimerizing acrylonitrile at about 0° C. to 200° C. in the presence of a tertiary phosphine of the formula $R_1R_2PR_3$, wherein $R_1$ and $R_2$ are alkyl radicals of 1–10 carbon atoms and may be alike or different, and $R_3$ is an alkyl radical of 1–10 carbon atoms, phenyl or $C_{1-10}$ alkyl substituted phenyl radical, and recovering from the reaction mixture the corresponding nitrile of α-methyleneglutaric acid; with the proviso that said acrylonitrile must be added slowly to the tertiary phosphines.

It is well known that polymerization takes place very rapidly and vigorously when the phosphine catalyst is introduced into the acrylic compound. Characteristic of this reaction is the great evolution of heat and the formation of a black polymeric material.

However, it has now been unexpecetdly discovered that when acrylonitrile is added slowly to a solution of the phosphine in an aromatic hydrocarbon solvent and the reaction is conducted at a temperature between 0° and 200° C. in the absence of oxygen, good yields of the dimer are obtained.

It is, indeed, unexpected and surprising that good yields of a simple dimer may be obtained by contacting and reacting acrylonitrile in the presence of tertiary phosphines by the process conditions of this invention, when, heretofore, it was known that polymerization occurred rapidly when the phosphine was introduced into the acrylic compounds. It is also surprising that under the process conditions of this invention dimerization is favored and formation of higher polymers is minimized.

In the dimerization of the acrylonitrile, it is preferred to conduct the addition and the reaction in the absence of air, preferably under an atmosphere of an inert gas, such as nitrogen. Oxygen tends to deteriorate the phosphine catalyst, forming phosphine oxides and therefore should not be present during addition and reaction.

Dimerization is conveniently effected at temperatures ranging from about 0° C. to 200° C., preferably 20° C. to 150° C., over a period of from 30 minutes to 4 hours.

Although not necessary, a polymerization inhibitor, such as phenothiazine, may be added to the reaction mixture to ensure against polymerization of the dimer product and is preferred.

At the end of the dimerization, the reaction mass, if at an elevated temperature, is cooled to room temperature and the phosphine catalyst is preferably neutralized with an acid or acid precursors, such as dilute HCl, dimethyl sulfate or acetic acid. The dimer is recovered from the reaction mass by distillation, preferably vacuum distillation.

The phosphine catalyst applicable in the dimerization of the above compounds is a tertiary phosphine of the formula $R_1R_2PR_3$, wherein $R_1$ and $R_2$ are alkyl radicals of 1 to 10 carbon atoms and may be alike or different and $R_3$ is alkyl of 1 to 10 carbon atoms, phenyl or phenyl radical having an alkyl substituent of 1 to 10 carbon atoms. Representative examples of suitable tertiary phosphines which are applicable in the novel process of this invention are as follow: tri-methyl phosphine, tri-ethyl phosphine, tri-n-butyl phosphine, tri-hexyl phosphine, di-ethyl decyl phosphine, di-ethyl phenyl phosphine, di-ethyl p-ethylphenyl phosphine, and di-ethyl p-decylphenyl phosphine.

A complex of the phosphine which dissociates slowly to yield the free phosphine may be used in place of the hereinbefore mentioned phosphine compound in the process of this invention. Representative examples of such complexes would be the tertiary phosphines described above complexed with a halide, e.g., chloride, bromide or iodide, of mercury, cadmium, gold, palladium, silver, nickel, cobalt, copper, platinum, zinc, or tin.

The amount of phosphine utilized is generally 0.02–0.05 part by weight of the monomer. The catalyst is preferably dissolved in an aromatic hydrocarbon solvent, such as benzene or p-xylene, at room temperature. The quantity of solvent is such that a liquid medium is provided for the reaction. Generally a ratio of 20–250 parts of solvent to one part of catalyst is effective. However, the quantity of the solvent is not critical and more concentrated solutions, such as 5 parts of solvent to one part of catalyst, as well as more dilute solutions, may be used. In the case of more dilute solutions, however, quantities of solvent in excess of 1000 parts of solvent to one part of catalyst are wasteful, requiring large apparatus and therefore are not preferred.

Representative examples illustrating the process are as follows. All parts are by weight unless otherwise specified.

EXAMPLE I

Thirty-nine and one-half parts of acrylonitrile were added dropwise under a nitrogen atmosphere to a stirred solution of 0.8 part of tri-n-butyl phosphine in 50 parts of benzene at 50° C. When the addition was complete, the mixture was stirred at 50° C. for ½ hour, and was then cooled to room temperature. The catalyst was neutralized by the addition of 100 parts of 1 N HCl. The layers were separated and the organic layer was washed twice with water, dried over $MgSO_4$, and distilled. Eleven and two tenths parts of acrylonitrile dimer (α-methyleneglutaronitrile) distilling at 59–68° C. under 0.20–0.35 mm. Hg pressure were obtained.

When diethyl phenyl phosphine or diethyl p-decylphenyl phosphine is used in the above example in place of tri-n-butyl phosphine substantially the same yield of acrylonitrile dimer is obtained.

EXAMPLE II

A 5 liter flask was purged with dry nitrogen. Dry benzene (2640 parts) and tri-n-butyl phosphine (12 parts) were charged into the flask. Subsequently, 600 parts of acrylonitrile, in which 6 parts of phenothiazine were dissolved, were slowly added at 50°±2° C. over a period of 20 minutes. The charge was then stirred at 50° C. for 1 hour and cooled to 10° C. Dimethyl sulfate (15 parts) was added and the product was vacuum distilled. The acrylonitrile dimer (α-methyleneglutaronitrile) was isolated as a colorless liquid having a boiling range of 100° C.–105° C. at 1 mm. Hg. The yield was 278 parts or 46.3% of theory of α-methyleneglutaronitrile.

When triethyl phosphine or tri-n-hexyl phosphine is used in place of tri-n-butyl phosphine in the above example, substantially the same results are obtained.

It has been shown by the foregoing examples that acrylonitrile can be satisfactorily dimerized in the presence of the selected tertiary phosphines of this invention.

The unsaturated dimer of the invention is useful as a monomer in the preparation of copolymers with other unsaturated compounds such as butadiene, acrylonitrile, styrene, and vinyl chloride to produce polymers having improved aging properties, compatibility and adhesion. Alpha - methyleneglutaronitrile is a useful cyanoethylating agent and may be hydrogenated to the corresponding diamine or converted to the corresponding dicarboxylic acid. The dimer is also useful as a dienophile in Diels-Alder reactions to produce polyfunctional cyclic compounds.

It is understood that the preceding examples are representative and that said examples may be varied within the scope of the total specification, as understood by one skilled in the art, to produce essentially the same result.

This application is a continuation-in-part of my copending application, Ser. No. 256,227, filed Feb. 5, 1963, now abandoned.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for dimerizing acrylonitrile at about 0° C. to 200° C. which process comprises adding said acrylonitrile slowly to a solution of an aromatic hydrocarbon solvent containing dissolved therein a catalytic amount of of a compound selected from the group consisting of a tertiary phosphine of the formula $R_1R_2PR_3$ and a complex of said tertiary phosphine with a chloride, bromide or iodide of mercury, cadmium, gold, palladium, silver, nickel, cobalt, copper, platinum, zinc or tin, wherein $R_1$ and $R_2$ each is an alkyl radical of one to ten carbon atoms and wherein $R_3$ is a radical selected from the group consisting of an alkyl having one to ten carbon atoms, phenyl, and a $C_1$ to $C_{10}$ alkyl substituted phenyl, and recovering from the reaction mixture α-methyleneglutaronitrile.

2. A process for dimerizing at 20° to 150° C. the compound $CH_2=CH—N$ which process comprises adding said compound slowly to a solution of an aromatic hydrocarbon solvent containing dissolved therein a catalytic amount of a tertiary phosphine of the formula $R_1R_2PR_3$. wherein $R_1$ and $R_2$ each is an alkyl radical of one to ten carbon atoms, and wherein $R_3$ is a radical selected from the group consisting of an alkyl having one to ten carbon atoms, phenyl, and a $C_1$ to $C_{10}$ alkyl substituted phenyl, and recovering from the reaction mixture α-methyleneglutaronitrile.

3. A process for dimerizing acrylonitrile at 20° to 150° C. which process comprises adding said acrylonitrile slowly to a solution of an aromatic hydrocarbon solvent containing dissolved therein a catalytic amount of tri-n-butyl phosphine and recovering from the reaction mixture α-methyleneglutaronitrile.

4. A process for dimerizing acrylonitrile at about 0° C. to 200° C. which process comprises adding acrylonitrile slowly under an inert gas to a solution consisting essentially of an aromatic hydrocarbon solvent, a polymerization inhibitor and a catalytic amount of a tertiary phosphine of the formula $R_1R_2PR_3$, wherein $R_1$ and $R_2$ each is an alkyl radical of one to ten carbon atoms, and wherein $R_3$ is a radical selected from the group consisting of an alkyl having one to ten carbon atoms, phenyl, and a $C_1$ to $C_{10}$ alkyl-substituted phenyl, and recovering from the reaction mixture α-methyleneglutaronitrile.

5. A process for dimerizing acrylonitrile at about 20° C. to 150° C. which process comprises adding acrylonitrile slowly under an inert gas to a solution of benzene, phenothiazine, and a catalytic amount of tri-n-butyl phosphine, and recovering from the reaction mixture α-methyleneglutaronitrile.

6. The process for the production of 2-methyleneglutaronitrile which comprises dimerizing acrylonitrile by adding acrylonitrile slowly to a catalytic amount of a trialkyl phosphine in an aromatic hydrocarbon solvent.

7. The process for the production of 2-methyleneglutaronitrile which comprises dimerizing acrylonitrile by adding acrylonitrile slowly to a catalytic amount of a phenyl dialkyl tertiary phosphine in an aromatic hydrocarbon solvent.

8. The process for dimerizing acrylonitrile to 2-methyleneglutaronitrile which comprises adding acrylonitrile slowly to a solution of an aromatic hydrocarbon solvent containing dissolved therein a catalytic amount of a catalyst selected from the group consisting of trialkyl phosphines and adducts of trialkyl phosphines with nickel chloride, nickel bromide or nickel iodide.

References Cited

Takashina et al.: 84 JACS, pp. 489–491, Feb. 5, 1962, QD–1–A5.

JOSEPH P. BRUST, Primary Examiner

PO-1050
(5/69)

UNITED STATES PATENT OFFICE
CERTIFICATE OF CORRECTION

Patent No. 3,567,759          Dated March 2, 1971

Inventor(s) Victor Tullio

It is certified that error appears in the above-identified patent and that said Letters Patent are hereby corrected as shown below:

In claim 2, line 2, a carbon atom was omitted from the formula which should read $$CH_2 = CH - CN$$

Signed and sealed this 22nd day of June 1971.

(SEAL)
Attest:

EDWARD M. FLETCHER, JR.          WILLIAM E. SCHUYLER, JR.
Attesting Officer                Commissioner of Patents